May 19, 1931.  R. METZ ET AL  1,805,779
LOCK
Filed Dec. 13, 1926
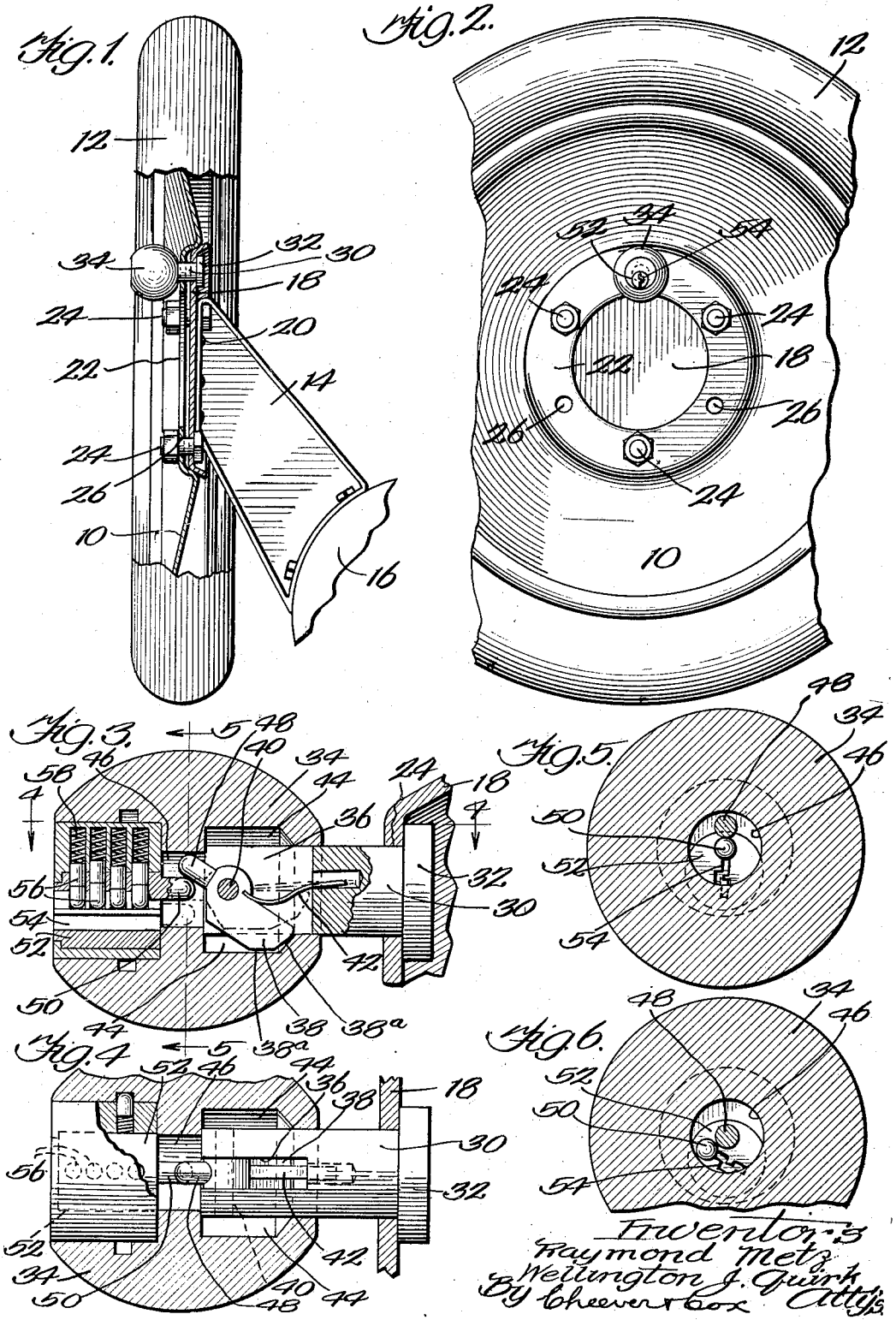

Patented May 19, 1931

1,805,779

UNITED STATES PATENT OFFICE

RAYMOND METZ AND WELLINGTON J. QUIRK, OF EVANSTON, ILLINOIS

LOCK

Application filed December 13, 1926. Serial No. 154,342.

This invention relates to locks generally. It has especial adaptation to devices for locking spare parts of various kinds, such as wheels, tires, etc., to automobiles, and the like; also for locking umbrellas, coats, etc., to fixed supports, and so on.

The object of the invention is to provide an easily constructible efficiently operating, practically indestructible and economical structure, effectively preventing the stealing of the article to be secured.

Somewhat specifically, the invention consists in providing in combination a practically non-breakable post on which the article to be fastened may be placed, and to equip the end of it with a lock nut or the like which is always rotatable on the post so that there is no ordinary obvious means of so handling the nut as to break the lock and thus release the articles secured by the device.

The invention consists in other features and details of invention hereafter more fully set forth in the specification and claims.

Referring to the drawings in which like numerals designate the same parts throughout the several views:

Figure 1 is a side, sectional elevation showing a tire as mounted at the rear of an automobile.

Figure 2 is a face view of the mechanism of Figure 1, taken from the left thereof.

Figure 3 is an enlarged, sectional, vertical detail view through the lock mechanism shown in Figs. 1 and 2.

Figure 4 is a plan view taken on the irregular line 4—4 of Figure 3.

Figure 5 is a sectional view taken on the line 5—5 of Figure 3, showing the mechanism in locked position.

Figure 6 is a changed position view of the parts shown in Figure 5, illustrating the unlocked position of the device.

In the preferred form of mechanism illustrated in the drawings, Figures 1 and 2 show a modern disc 10 automobile wheel carrying a tire 12 mounted on a bracket 14, rigidly attached by any suitable means to an automobile frame 16. The bracket 14 carries a more or less conventional circular plate 18, rigidly secured in position by any suitable means, as for instance, rivets 20. This plate 18 enters the hub section 22 of the wheel disc 10 and the wheel disc is rigidly secured in position by a multiplicity of conventional bolts 24, in the particular case here shown three in number, entering selected ones of conventional holes 26 provided in the wheel disc 10 for attaching the wheel to the vehicle hub or to this support as the case may be. As shown, only three of the six holes 26 are occupied by bolts 24 and one of the holes, in the particular case here illustrated, is entered by locked post 30 having a head 32 fitting against the inside of member 22 heretofore referred to. The fit of the bolt or post 30 in the position shown in detail in Figures 4 and 5 is at least sufficiently tight so as to prevent rotation of the post in the hub member 22. It may be, if desired, rigidly secured in place by welding or any conventional mechanism. Post 30 is of sufficient length so that as shown it extends through the hub section 22 of the wheel beyond which is located the preferably approximately spherical nut 34 of this invention telescopically enclosing the outer end of post 30, as clearly shown in the drawings. The outer end portion of post 30 is provided with a slot 36 within which is located a locking latch or dog 38 sustained on a pivot 40 entered cross-wise of the slot 36. This dog 38 is preferably but not necessarily controlled by a spring 42 which normally holds it in the dotted line position of Figure 3 in which its locking edge 38a is retained above and clear of cylindrical lock recess 44 formed in the spherical nut 34. This recess 44 being, as stated, cylindrical, allows free rotation of nut 34 on post 30 when the parts assume the locked position of Figures 3, 4 and 5, as hereinafter described, but as locking edge 38a is, during such rotation in locking recess 44, it is impossible to remove spherical nut 34 longitudinally of post 30 off therefrom.

Nut 34 is provided with a central chamber 46 immediately adjacent to the end of post 30, when the parts are in assembled position as shown, said recess being entered by a knob 48 projecting from and rigid with lock lever 38. This recess 46 is also entered by a knob 50 on the end of a conventional key barrel 52 conventionally rotatably mounted in spherical nut 34 on the side of recess 46 which is away from the end of post 30. Lock barrel 52 is mounted eccentrically to the central axis of post 30 and the knobs 48 and 50 so engage each other that when the lock barrel is rotated to the position of Figures 3, 4 and 5, it swings knob 48 and consequently the entire lock lever 38 to the position of Figure 3 wherein locking edge 38a enters lock recess 44 thereby as heretofore described preventing the separation of nut 34 from post 30; but knob 48 travels around knob 50 as rotation of nut 34 on post 30 is attempted as heretofore described, the result of this construction being that when anyone attempts to tamper with the lock mechanism of this invention, they cannot by rotating nut 34 either with a wrench or otherwise in any way injure the lock mechanism.

Lock barrel 52 is provided with a key slot 54 within which a conventional serrated edge key may be inserted to shift conventional lock plungers 56, controlled by springs 58, to the conventional position where the key can rotate the barrel 54 from the position of Figure 5 to that of Figure 6 and the dotted line position of Figure 3, in which position knob 50 is sufficiently out of the way of knob 48 so that spring 42 can throw lock lever 38 to the dotted line position of Figure 3 in which position, as heretofore explained, the lever 38 is entirely within the circumference of post 30 and spherical nut 34 can be removed from post 30 with the result that, so far as the lock is concerned, the automobile wheel can be removed from bracket 14 at the will of the operator.

To assemble the parts in locked position the operator inserts his key in the lock mechanism of nut 34 and turns the barrel 52 to the position of Figure 6, places the nut 34 in place on post 30, then rotates the key to turn the barrel from the position of Figure 6 to that of Figure 5, thus locking the nut upon the post.

The mechanism of this invention has been placed in use and proves in actual practice to be very efficient for the purposes herein stated.

Having thus described our invention, what we claim as new and desire to secure by Letters Patent is:

1. In a lock in combination, two members, the first entering the second, to be detachably secured together, a lock part carried by one of said two members located, when the parts are in locked position, inside said second member, key operated means for so moving the lock member that the first mentioned parts may be separated, and resilient means for normally urging the lock part into an unlocked position.

2. In mechanism of the class described, in combination, a post, a nut detachably rotatably mounted on the post, a key operated lock mechanism concealed within the nut including a detent for operatively locking the nut to the post without disturbing the rotatability of the nut on the post, and resilient means for urging the detent into an unlocked position.

3. In a mechanism of the class described in combination, two members, the first entering the second, to be detachably secured together, a pivoted detent carried by one of said two members, adapted when the parts are in locked position to extend into said second member, a spring means secured at one extremity to the detent and mounted at the other extremity in said first member, said spring means serving to normally urge the detent into an unlocked position with respect to said members, key-operated means for moving the detent, and means permitting rotation of one of said first mentioned members, while they are locked together.

4. In mechanism of the class described, in combination, a post, one end of said post being formed with a flange to prevent longitudinal displacement thereof in one direction, a nut detachably and rotatably mounted on the post, a key operated lock mechanism adapted to be concealed within said nut, said mechanism including a detent pivotally mounted upon the post, said detent being constructed and arranged to lock the nut to the post without disturbing the rotatability of the nut on the post, and resilient means for normally urging said pivoted detent into unlocked position.

In witness whereof, we have hereunto subscribed our names.

RAYMOND METZ.
WELLINGTON J. QUIRK.